US012700293B2

(12) United States Patent
Melcher

(10) Patent No.: US 12,700,293 B2
(45) Date of Patent: Aug. 4, 2026

(54) HEAT-ACTIVATED ALARM AND RESPONSE SYSTEM

(71) Applicant: Todd Patrick Melcher, Fullerton, CA (US)

(72) Inventor: Todd Patrick Melcher, Fullerton, CA (US)

( * ) Notice: Subject to any disclaimer, the term of this patent is extended or adjusted under 35 U.S.C. 154(b) by 570 days.

(21) Appl. No.: 18/003,481

(22) PCT Filed: Jun. 30, 2021

(86) PCT No.: PCT/US2021/039968
§ 371 (c)(1),
(2) Date: Dec. 27, 2022

(87) PCT Pub. No.: WO2022/006321
PCT Pub. Date: Jan. 6, 2022

(65) Prior Publication Data
US 2023/0245542 A1 Aug. 3, 2023

Related U.S. Application Data

(60) Provisional application No. 63/047,565, filed on Jul. 2, 2020.

(51) Int. Cl.
*G08B 17/06* (2006.01)
*A62C 37/11* (2006.01)
(Continued)

(52) U.S. Cl.
CPC .............. *G08B 17/06* (2013.01); *A62C 37/11* (2013.01); *G08B 3/10* (2013.01); *G08B 1/08* (2013.01); *G08B 7/06* (2013.01)

(58) Field of Classification Search
CPC . G08B 17/06; G08B 3/10; G08B 1/08; G08B 7/06; A62C 37/11
See application file for complete search history.

(56) References Cited

U.S. PATENT DOCUMENTS 9,381,389 B2 * 7/2016 Chattaway ............. A62C 37/48
9,773,627 B2 * 9/2017 Koehler .................. F03G 7/065
(Continued)

FOREIGN PATENT DOCUMENTS

CN 202 976 385 U 6/2013
JP U06-033296 4/1994
(Continued)

OTHER PUBLICATIONS

English language translation of JP H10269470 A (Year: 1998).*
(Continued)

*Primary Examiner* — John A Tweel, Jr.
(74) *Attorney, Agent, or Firm* — Knobbe, Martens, Olson & Bear LLP

(57) ABSTRACT

A heat-activated fire-suppression system is provided. The system can include one or modules installed in an exterior panel of a building. The one or more modules can include a shape memory alloy wire that deforms upon heating to cause the module to release a pressurized substance. The system can include an alarm module that emits an auditory alarm. The system can include a fire-suppression module that releases a fire-suppressing substance upon the shape memory wire deforming in response to heating.

7 Claims, 8 Drawing Sheets

(51) Int. Cl.

| | |
|---|---|
| ***G08B 3/10*** | (2006.01) |
| *G08B 1/08* | (2006.01) |
| *G08B 7/06* | (2006.01) |

(56) References Cited

U.S. PATENT DOCUMENTS

| | | | | |
|---|---|---|---|---|
| 11,645,897 | B2 * | 5/2023 | Carlson | G08B 13/2491 340/551 |
| 2004/0130445 | A1 | 7/2004 | Graves | |
| 2015/0375023 | A1 | 12/2015 | Seliverstov et al. | |
| 2016/0093186 | A1 | 3/2016 | Pinto et al. | |
| 2016/0256719 | A1 | 9/2016 | Phillips | |
| 2020/0023218 | A1 * | 1/2020 | Reese, III | G01K 1/024 |
| 2020/0086148 | A1 | 3/2020 | Aldino et al. | |

FOREIGN PATENT DOCUMENTS

| | | | | |
|---|---|---|---|---|
| JP | H09 276431 A | | 10/1997 | |
| JP | H10 269470 | * | 10/1998 | G08B 17/00 |
| JP | H10269470 A | * | 10/1998 | G08B 17/00 |
| JP | A2004-201961 | | 7/2004 | |
| WO | WO 2005/022478 | | 10/2005 | |
| WO | WO 2019/160290 A1 | | 8/2019 | |

OTHER PUBLICATIONS

International Search Report and Written Opinion issued in PCT Application No. PCT/US2021/039968, dated Sep. 16, 2021, in 23 pages.

Extended European Search Report issued in European Patent Application No. 21834136.0, dated Sep. 27, 2024, in 15 pages.

* cited by examiner

HEAT-ACTIVATED ALARM AND RESPONSE SYSTEM

CROSS-REFERENCE TO RELATED APPLICATIONS

Any and all priority claims identified in the Application Data Sheet, or any correction thereto, are hereby incorporated by reference under 37 CFR 1.57. This application is the U.S. National Phase of International Application No. PCT/US2021/039968 filed Jun. 30, 2021, which claims the benefit of U.S. Provisional Application No. 63/047,565, filed Jul. 2, 2020. Each of the aforementioned applications is incorporated by reference herein in its entirety, and each is hereby expressly made a part of this specification.

FIELD

Certain embodiments discussed herein relate to methods, systems, and devices that protect against dangerous conditions such as a building fire.

DISCUSSION OF THE RELATED ART

Fire-protection systems for buildings can be complex. Residential or commercial buildings may have intricate fire-protection systems that include multiple sensors (e.g., temperature sensors, smoke sensors) and response systems (e.g., sprinklers, alarms) that are coordinated to monitor and maintain the safety of the building. These systems can be expensive to install and maintain. A need exists for devices and systems that can provide alternative options for maintaining building safety.

SUMMARY

The systems, methods and devices described herein have innovative aspects, no single one of which is indispensable or solely responsible for their desirable attributes. Without limiting the scope of the present disclosure, some of the advantageous features will now be summarized.

In a first aspect, a module for a fire-suppression and/or alarm system is described. The module comprises a cylinder containing a substance under pressure therein; a seal configured to block the substance from exiting the cylinder when the seal is in an intact configuration, the seal further configured to allow the substance to exit the cylinder when the seal is in a broken configuration; and a shape memory alloy wire configured to cause a trigger to move the seal from the intact configuration to the broken configuration upon a heating of the shape memory alloy wire to a deformation temperature.

In some embodiments, the module further comprises a horn portion through which the substance passes to generate an auditory alarm. In some embodiments, the auditory alarm has a sound level of 120 decibels and a duration of between 5 minutes to 60 minutes. In some embodiments, the auditory alarm comprises a first musical note and a second musical note that are superimposed. In some embodiments, the substance is a fire-suppressing substance. In some embodiments, the fire-suppressing substance is a foam. In some embodiments, the fire-suppressing substance is carbon dioxide. In some embodiments, the trigger comprises a seal-breaking element configured to puncture the seal, and wherein the heating of the shape memory alloy wire to the deformation temperature causes a length of the shape memory alloy wire to decrease such that the cylinder is drawn toward the seal-breaking element. In some embodiments, the trigger further comprises a gas or fluid conduit configured to regulate a pressure of the substance exiting the cylinder.

In a second aspect, a module for a heat-activated alarm system is described. The module comprises a sound emitter, a power circuit configured to connect the sound emitter to a source of electrical power, an insulator disposed at least partially within the power circuit when the module is in an armed configuration such that the insulator interrupts the power circuit, and a shape memory alloy wire configured to connect the power circuit to provide electrical power to the sound emitter by at least partially removing the insulator from the power circuit upon a heating of the shape memory alloy wire to a deformation temperature.

In some embodiments, the power circuit comprises at least one battery and a conductive contact positioned to connect to a first terminal of the at least one battery, the insulator disposed between the conductive contact and the first terminal when the module is in the armed configuration. In some embodiments, a first end of the shape memory alloy wire is fixed relative to the module and wherein a second end of the shape memory alloy wire opposite the first end is mechanically connected to the insulator. In some embodiments, the heating of the shape memory alloy wire to the deformation temperature causes a length of the shape memory alloy wire to decrease such that the insulator is pulled away from the power circuit. In some embodiments, the sound emitter comprises an electromagnetic horn. In some embodiments, the sound emitter comprises a speaker configured to play at least one of an alarm sound and a verbal message. In some embodiments, the speaker is configured to play at least a verbal message selected to activate one or more voice-activated network-connected devices. In some embodiments, the module further comprises at least one light source configured to be powered by the power circuit when the insulator is at least partially removed from the power circuit. In some embodiments, the at least one light source comprises at least one strobe.

In a third aspect, a fire-suppression and/or alarm system comprises a cladding structure comprising an enclosed compartment, and a module disposed at an exterior surface of the cladding structure, the module comprising a cylinder containing a substance under pressure therein, an interior portion of the module disposed within the compartment. The module comprises a shape memory alloy wire configured to deform upon heating to cause the cylinder to release the substance from the cylinder.

In some embodiments, the substance is a fire-suppressing foam. In some embodiments, the module further comprises a horn portion through which the gas passes upon leaving the cylinder to generate an auditory alarm.

In a fourth aspect, a method of installing a fire-suppression and/or alarm system on a building comprises making an opening in an exterior wall of the building, and placing a module in the opening such that a shape memory alloy (SMA) wire of a trigger of the module is adjacent the exterior wall. The SMA wire is configured to undergo a deformation upon heating to cause the module to release a substance contained within a pressurized canister.

In some embodiments, the substance is a fire-suppressing foam. In some embodiments, the method further comprises placing a portion of the module within an enclosed compartment formed in part by the exterior wall.

Any of the features, components, or details of any of the arrangements or embodiments disclosed in this application, including without limitation any of the methods, systems, and devices disclosed below, are interchangeably combinable with any other features, components, or details of any of the arrangements or embodiments disclosed herein to form new arrangements and embodiments.

BRIEF DESCRIPTION OF THE DRAWINGS

The present inventions are described with reference to the accompanying drawings, in which like reference characters reference like elements.

DETAILED DESCRIPTION

While the present description sets forth specific details of various aspects of the present disclosure, it will be appreciated that the description is illustrative only and should not be construed in any way as limiting. Furthermore, various applications of such aspects and modifications thereto, which may occur to those who are skilled in the art, are also encompassed by the general concepts described herein.

Generally described, the present disclosure provides systems and modules for temperature-dependent alarm and/or fire suppression. For the sake of simplicity, the systems of the present disclosure will be described in terms of a fire alarm and prevention system for a building structure. However, the systems and devices of the present disclosure can be used on other types of structures (e.g., vehicles, public structures) and for purposes other than fire prevention (e.g., issuing a "heat advisory" warning, monitoring for forest fires, etc.). For example, the systems and devices of the present disclosure can be installed on a play structure of a park or school. The system can monitor the ambient temperature conditions near the play structure. When the system detects that the ambient conditions are potentially dangerous to people or pets, the system can emit an alarm to inform people that the outside conditions are potentially dangerous for overheating. In other variants, activating the system can trigger the system to activate a water-misting cooling spray near the play structure. In some aspects, the system can include a plurality of modules that are distributed within a forest and configured to alert a fire-monitoring service of the coordinates of a module that has been activated by a heat event indicative of a fire, as described herein.

In some aspects, the present disclosure is directed to a technology that is designed from the ground up to fill or neutralize a limited space. For example, a building can have a void between an exterior cladding panel and an underlying insulation that are attached to the building. In some conditions, these voids can foster the spread of fire. In some cases, the voids can intensify the fire by providing flow paths for oxygen to feed the fire. The systems of the present disclosure can be arranged to neutralize these voids. In some aspects, the systems of the present disclosure are customizable. For example, the system can allow the number of void-filling units that are attached to the cladding to be adjusted to ensure the void volume is sufficiently filled. In some aspects, the system can be easily retrofitted onto existing cladding and insulation, as discussed herein.

Figure 1:
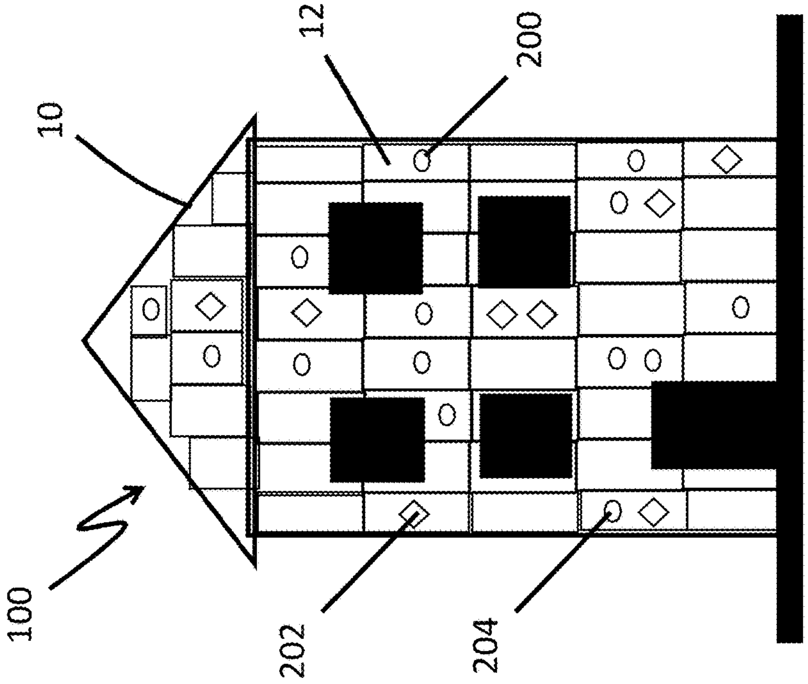
FIG. 1 illustrates a front view of a building equipped with a fire-protection system according to some aspects of the present disclosure.

FIG. 1 illustrates a fire-prevention system 100, according to some aspects of the present disclosure. The system 100 can include one or more modules 200. The modules 200 can be installed on a building structure 10. In the illustrated embodiment, the modules 200 are shown installed on an exterior panel 12 of the building structure 10. In some aspects, the panel 12 can be a cladding structure, as described herein. In some variants, the modules 200 can be installed on an interior wall or surface of the building structure 10. In some arrangements, the modules 200 are hidden from view. For example, the illustrated modules 200 can be hidden from view by covering the exterior panel 12 with an overlay layer that provides a veneer or facing to the building structure 10. In some variants, the modules 200 are left exposed and remain visible after installation into the panel 12. In some variants, the modules 200 can be sized or otherwise arranged to blend in visually with the surrounding panel 12 so that the appearance of the modules 200 is reduced or minimized.

With continued reference to FIG. 1, the system 100 can include different types of modules 200. For example, the system 100 can include one or more alarm modules 202 (denoted as open circles) and one or more fire-suppression modules 204. The alarm module 202 can respond to a detected dangerous condition (e.g., fire) by producing an alarm. In some arrangements, the alarm module 202 can emit a loud noise (e.g., whistle) to alert nearby people that a dangerous condition (e.g., fire) has been detected. In some variants, the alarm module 202 can be connected to a communication network and configured to alert a monitoring service or fire station that a dangerous condition has been detected at the building 10. As shown in FIG. 1, the system 100 can include panels 12 that have different combinations of alarm modules 202 and fire-suppression modules 204. For example, some panels 12 can contain one or more alarm modules 202 and contain no fire-suppression modules 204. Some panels 12 can contain one or more fire-suppression modules 204 and contain no alarm modules 202. Some panels 12 can contain a mixture of alarm modules 202 and fire-suppression modules 204.

Figure 2:
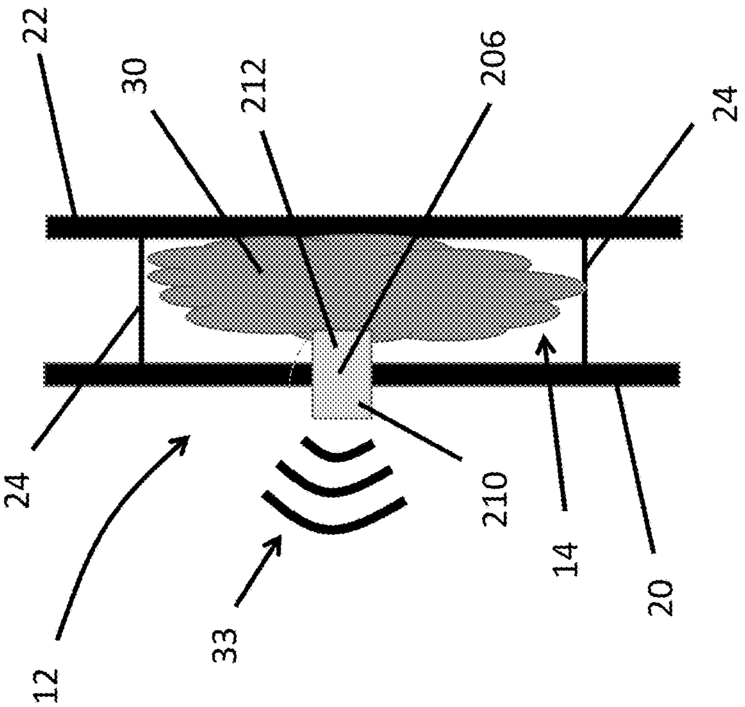
FIG. 2 illustrates a side view of a system module installed in a building wall according to some aspects of the present disclosure.

FIG. 2 illustrates that in some aspects the module 200 can be a dual-purpose module 206 configured to perform both alarm and fire-suppression functions. In the illustrated embodiment, the dual-purpose module 206 is shown installed into a panel 12 of the building 10. In the illustrated embodiment, the dual-purpose module 206 has an exterior portion 210 disposed at the exterior wall 20 of the building 10. In some variants, the exterior portion 210 can be directly exposed to or in contact with the outside environment of the building 10. In some arrangements, the exterior portion 210 can be concealed visually beneath a facing or covering layer of the building 10, as described herein.

The dual-purpose module 206 can have an interior portion 212 that extends into the building from the exterior wall 20.

The panel 12 can include or define a cladding system in which voids or compartments 14 are formed between the exterior wall 20, an opposing wall 22, and a plurality of spanning walls 24 that extend between the exterior wall 20 and the opposing wall 22, as indicated in FIG. 2. The interior portion 212 of the dual-purpose module 206 can extend into the compartment 14. The interior portion 212 can be configured to release a fire-suppressing substance 30 into the compartment 14. In some aspects, the fire-suppressing substance 30 can be a foam, a gel, a liquid, or a gas. The fire-suppressing substance 30 can fill the compartment and reduce or eliminate the void within the compartment 14. As described herein, in some aspects the fire-suppressing substance 30 can fill or neutralize the void enclosed by the compartment 14. In some aspects, filling the compartment 14 with the fire-suppressing substance 30 can slow or eliminate the spread of a fire through the building 10. In some aspects, the fire-suppressing substance 30 can slow or eliminate the spread of fire over or through the panel 12 or cladding structure of the building 10. In some aspects, the exterior portion 210 can be configured to emit an auditory alarm 33. In some aspects, the dual-purpose module 206 can be differently arranged. For example, the exterior portion 210 can be configured to release a fire-suppressing substance 30 that is configured to coat or flow over the exterior surface of the panel 12. In some aspects, the interior portion 212 can be configured to emit the auditory alarm in the compartment 14. In some aspects, the fire-suppressing substance 30 can be a gas (e.g., carbon dioxide) and the auditory alarm can be powered by the fire-suppressing gas as it is released to fill the void of the compartment 14.

Figure 3:
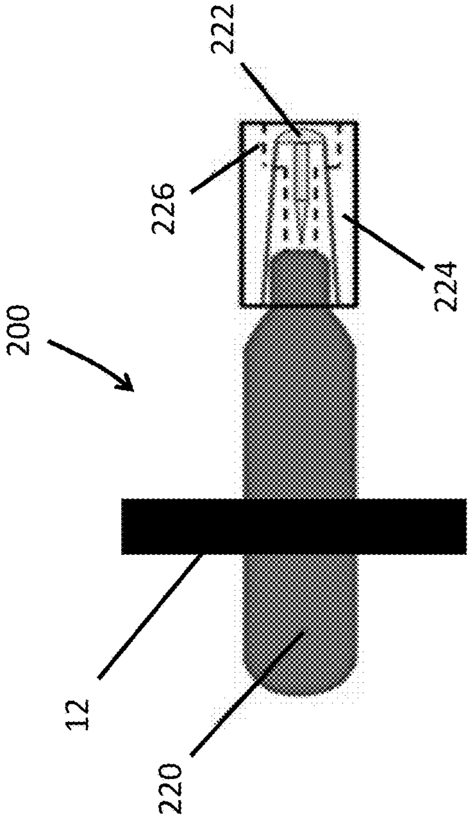
FIG. 3 illustrates a side view of a system module installed in a building wall and in an armed configuration according to some aspects of the present disclosure.

FIG. 3 illustrates the module 200 can include a canister 220, a seal-breaking element 222, and a trigger 224. The trigger 224 can be configured to move the module 200 from an armed configuration to an activated configuration. In the armed configuration, the canister 220 is sealed and full of a compressed fluid (e.g., a gas, a fire-suppressing foam). In the activated configuration, the canister 220 is open and the compressed fluid is released from the canister 220. The trigger 224 can include a temperature-sensitive material (e.g., a shape memory alloy). In some aspects, the trigger 224 can include a shape memory alloy (SMA) wire 226. The SMA wire 226 can be configured to undergo a temperature-dependent deformation when the module 200 reaches an elevated temperature indicative of the panel 12 being on fire. In other words, the SMA wire 226 can be configured to change its structure upon the panel 12 temperature increasing beyond a temperature that would not occur under natural environmental conditions. The SMA wire 226 can deform to directly or indirectly cause the release of the seal-breaking element 222 such that the seal-breaking element 222 breaks a seal of the canister 220, releasing the gas or fluid contained therein. In FIG. 3, the module 200 is shown installed in a panel 12 and in the armed configuration.

The module 200 can be configured to remain in the armed configuration for a prolonged time (e.g., 30 years). In some arrangements, the module 200 can be configured to remain in the armed configuration for: 2 years, 5 years, 10 years, 15 years, 20 years, 30 years, 40 years, 60 years, 100 years, values between the aforementioned values, and otherwise. In some aspects, the modules 200 can allow the system 100 to provide fire protection for a prolong prolonged time without requiring any power supply to the system 100. In other words, the modules 200 can rest dormant in the active state for years and then shift to the activated state when needed. The modules 200 can become activated by the shape memory wire 226 being warmed to a temperature that indicates the module 200 is near a fire. In some aspects, the system 100 can be retrofitted onto a building 10 with existing panels 12. In some aspects, the system 100 can be retrofitted onto a building 10 by making a hole in a panel 12 of the building and installing the module 200 into the hole made in the panel 12. In some aspects, the system 200 can provide an inexpensive way to maintain fire-protection vigilance for a prolong period of time. In some aspects, the system 100 can be installed easily. In some aspects, installation of the system 100 can be simple and can require only the use of a cordless drill to install modules 200 of the system 100 into existing panels, as described herein.

Figure 4:
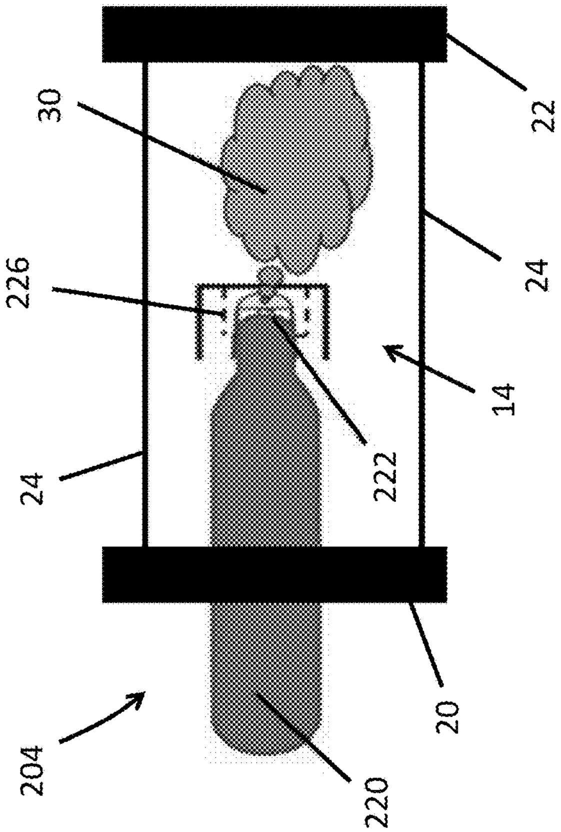
FIG. 4 illustrates a side view of the system module in FIG. 3 after the system module has moved from the armed configuration to the activated configuration.

FIG. 4 illustrates a fire-suppression module 204 installed in an exterior wall 20. The fire-suppression module 204 is shown in the activated state in which a fire-suppressing substance 30 is released from the canister 220 and into the compartment 14, as described herein. In the illustrated embodiment, the fire-suppression module 204 includes an SMA wire 226 that has deformed to move the seal-breaking element 222 into the canister 220. The SMA wire 226 can trigger the release of the fire-suppressing substance 30 by, for example, displacing a locking pin to free a spring and drive a piercing element into a seal. In some arrangements, the SMA wire 226 can be embedded in a seal (e.g., rosin) that shatters when the SMA wire deforms.

Figure 5:
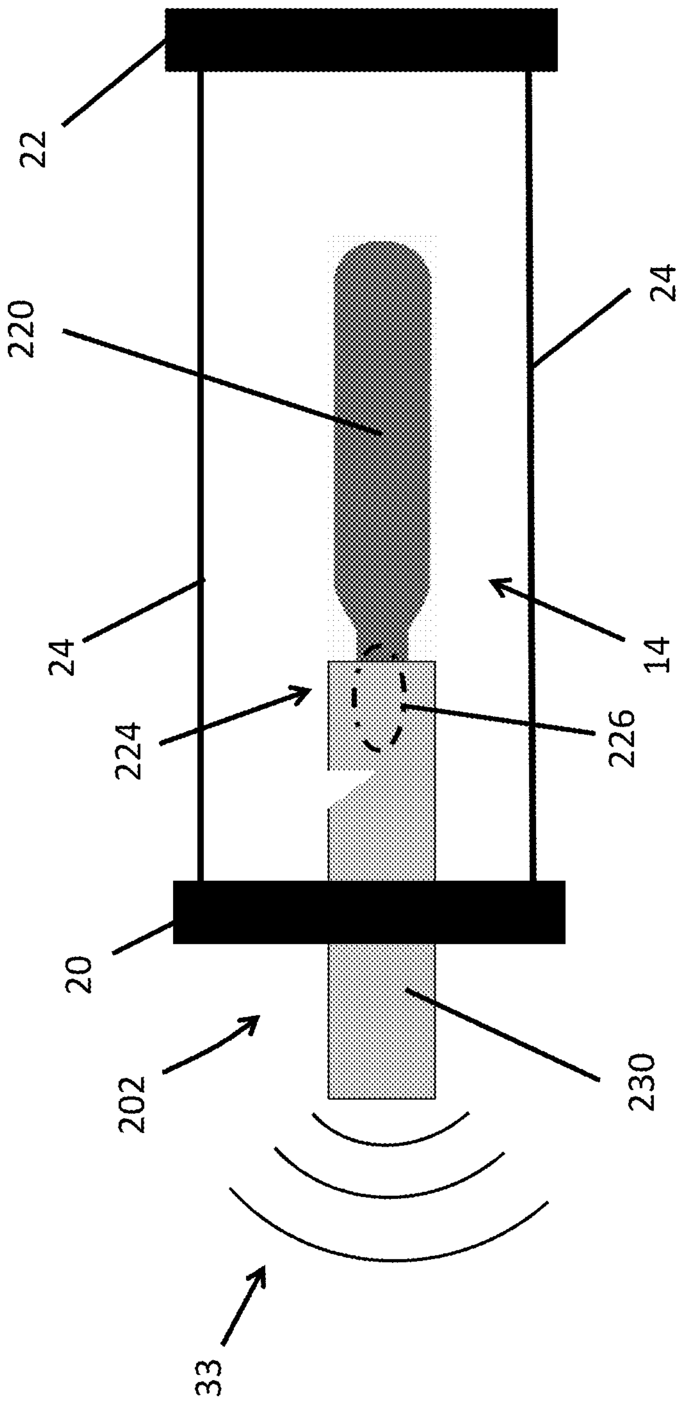
FIG. 5 illustrates a side view of a system module according to some aspects of the present disclosure.

FIG. 5 illustrates an alarm module 202 installed in an exterior wall 20. The alarm module 202 is shown in the activated state in which an auditory alarm 33 is being emitted from the alarm module 202 as gas is released from the canister 220. The alarm module 202 can include a horn portion 230 that generates the auditory alarm 33. In the illustrated embodiment, the horn portion 230 is arranged to sound outside of the compartment 14 as the gas within the cylinder 220 is released through the horn portion 230 to exit the compartment 14. In some arrangements, the horn portion 230 can be arranged to sound within the compartment 14 and can be powered by a fire-suppressing gas (e.g., carbon dioxide) that passes through the horn portion 230 to enter and fill the compartment 14 with the fire-suppressing gas. The horn portion 230 can be a sound-generating structure such as: a horn, a reed, a whistle, a flute, a harmonica, or other wind instrument. The alarm module 202 can include a trigger 224 that moves the alarm module 202 from the armed configuration to the activated configuration, as discussed. The trigger 224 can include an SMA wire 226, as described herein. In some aspects, the auditory alarm 33 can include multiple musical notes. For example, in some variants, the auditory alarm 33 can include a first note that is generated by passing a first portion of the escaping air from the cylinder through a first horn, reed, key, or whistle and passing a second portion of the escaping gas from the cylinder through a second horn, reed, key, or whistle to generate a second musical note. The alarm module 202 can emit an auditory alarm 33 that includes one or more musical notes that are superimposed or played together. In some aspects, the alarm module 202 can be configured to generate a sound of: 10 dB, 20 dB, 40 dB, 60 dB, 80 dB, 120 dB, 150 dB a value between any of the aforementioned values, and otherwise. In some aspects, the alarm module 202 can be configured to emit an auditory alarm 33 for: 10 seconds, 30 seconds, 60 seconds, 2 minutes, 5 minutes, 10 minutes, 20 minutes, 30 minutes, 60 minutes, values between any of the aforementioned values, and otherwise. In some aspects, the alarm module 202 is configured to emit an auditory alarm 33 of 120 dB that lasts between 5 and 60 minutes.

Aspects of the present disclosure have been described in the context of a fire-suppression system for a building.

However, the system can be used in other conditions where void neutralization is desired. For example, the systems disclosed herein can be applied to a computer case, a transformer box, a water heater, and other systems to extinguish an interior fire. In some aspects, the system can be arranged such that once a dangerous or undesired heat event occurs, the system fills the case or enclosed space with an extinguishing gas or other substance (e.g., fire-suppressing foam). In some arrangements, the system can be adapted for use in interior walls of a home or apartment. In some aspects, the system can be retrofitted into the interior walls of a building. The system can be tailored to fill voids formed between the drywall and the studs. The drywall and studs can form a cellularity or a network of voids that are enclosed by drywall and each pair of adjacent studs. In some aspects, the system can attack the wall cellularity one void at a time until the fire stops spreading.

In some aspects, the system 100 can be a network of modules 200 installed or retrofitted into a building. For example, the system 100 can be installed or retrofitted in an apartment building having multiple units. Each unit can have 15 or more modules 200 installed to protect the unit from fire. In some aspect, the system 100 can be two separate networks: one network of alarms and one network of fire suppressors. In the event fire breaks out in the building, the alarms can act in series when the pre-set temperature is reached. If the fire moves throughout the building, more alarms will sound as the fire continues to grow. In some arrangements, fire suppressors can be set to begin going off in series, following the path of spent alarms. In some aspects, the fire suppressors can be set to activate at a pre-set temperature that is higher than the alarms. In some arrangements, the network of alarms and fire suppressors can be installed on the cladding of a building in sufficient number to overflow the voids of the cladding with a fire-suppressing gas (e.g., carbon dioxide). For example, thousands of modules can be installed in the exterior cladding of a building such that in the event of a fire, the voids of the exterior cladding are filled with a fire-suppressing gas to such an extent that the fire is not only slowed but is extinguished as the fire-suppressing gas flows out of the void and down onto the fire.

In some aspects, the system 100 can be configured to monitor a large span of land for wildfires. For example, with reference to FIG. 5, the horn portion 230 of the alarm module 202 can be replaced with a micro-generator (not shown) that is powered by the gas that escapes from the cylinder 220. As described herein, the alarm module 202 can be configured such that an SMA wire 226 deforms upon a heating of the wire 206 to a temperature indicative of a fire being in the vicinity of the alarm module 202, triggering the cylinder 220 to release the gas contained within the canister 220. The gas escaping from the canister 220 can be configured to flow through the turbine of a micro-generator (not shown), powering the micro-generator to generate sufficient electricity to allow the activated alarm module 202 to transmit a signal to a fire-monitoring service. In some aspects, the alarm module 202 can be configured to wirelessly transmit the GPS coordinates of the activated alarm module 202 for five minutes. In some aspects, the system 100 can include a plurality of alarm modules 202 that are distributed across a large span of land that is susceptible to fire (e.g., forest). The plurality of alarm modules 202 can be suspended from trees (e.g., dropped from aircraft) or installed into trees by driving the module 202 into the trunk of the tree. The plurality of alarm modules 202 can provide an economical, fire-monitoring network or system 100 for monitoring the span of land over which the plurality of modules 202 is distributed. In some aspects, one or more gas-powered micro-generator alarm modules 202 can be included in the fire-suppression systems 100 described herein with regard to buildings. The alarm modules 202 can be configured to transmit to a fire-monitoring service or to a nearby fire-station the GPS coordinates of an alarm module 202 that has been activated by a heat event indicative of a fire in the vicinity of the alarm module 202.

Figure 6B:
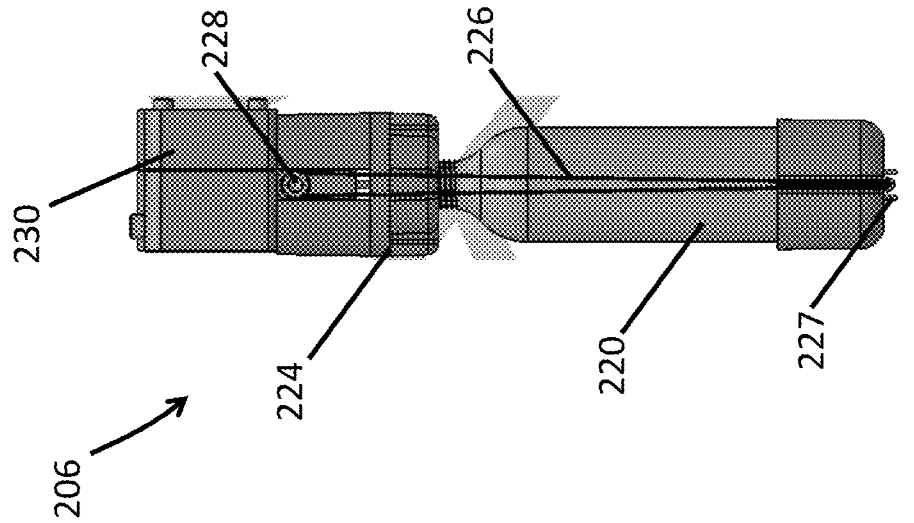
FIGS. 6A and 6B illustrate an example system module according to some aspects of the present disclosure.
Figure 6A:
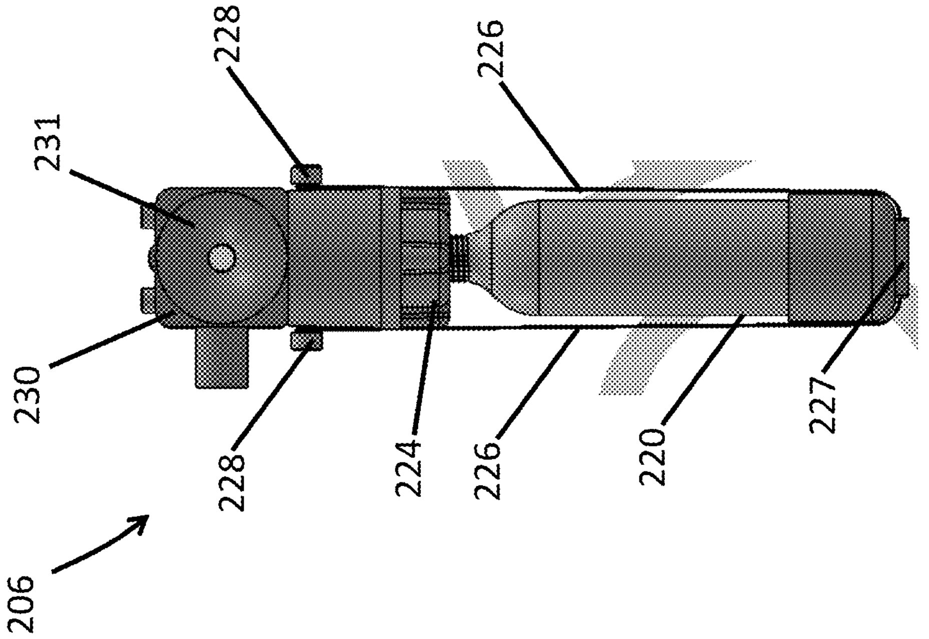

FIGS. 6A and 6B illustrate an example implementation of a dual purpose module 206 in accordance with the present technology. The dual purpose module 206 includes a cylinder 220 and a trigger 224 that moves the dual purpose module 206 from the armed configuration to the activated configuration, as discussed elsewhere herein. The dual purpose module 206 further includes a horn portion 230, including a bell 231, that generates an auditory alarm.

The cylinder 220 may be screwed into the trigger 224 and is further retained relative to the trigger 224 by one or more SMA wires 226. In the example implementation of FIGS. 6A and 6B, the one or more SMA wires 226 are in the form of a single loop of SMA wire 226 looped around retaining knobs 228 of the trigger 224 and passing through a retaining structure 227 at an opposite end of the cylinder 220. The loop of SMA wire 226 is configured to deform by contracting (e.g., by up to 2%, 3%, 4%, 5%, or more, of the length of the SMA wire 226). As the SMA wire 226 contracts at a high temperature as disclosed elsewhere herein, the length of the loop of SMA wire 226 decreases such that the cylinder 220 is drawn closer to the trigger 224. As the cylinder 220 is drawn toward the trigger 224, a sealed tip of the cylinder contacts a seal-breaking element 232 (FIGS. 7A-7B) disposed at least partially within the trigger 224, puncturing the seal and allowing pressurized gas or fluid to leave the cylinder 220. The pressurized gas or fluid leaving the cylinder activates the horn portion 230 to create an audible alarm, and at least partially fills a void around the dual purpose module 206, as described elsewhere herein.

Figure 7B:
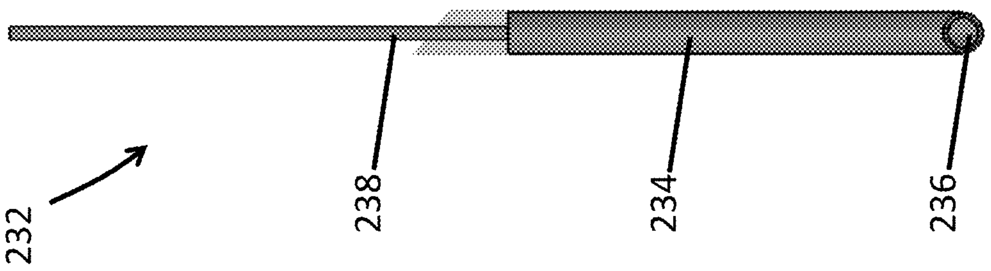
FIGS. 7A and 7B illustrate an example seal-breaking element according to some aspects of the present disclosure.
Figure 7A:
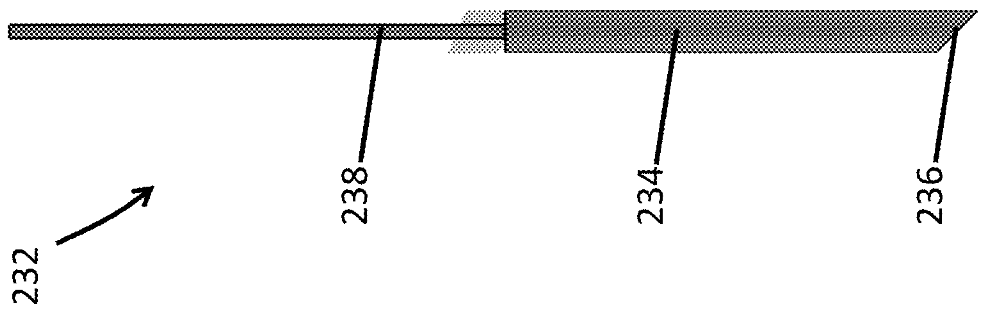

FIGS. 7A and 7B illustrate an example seal-breaking element 232 according to some aspects of the present disclosure. In some embodiments, the seal-breaking element 232 may be implemented within the trigger 224 and/or horn portion 230 of any of the modules disclosed herein, such as the dual purpose module 206 of FIGS. 6A-6B. The seal-breaking element 232 includes a needle 234 and a gas or fluid conduit 238.

The needle 234 is a hollow tubular structure having an angled tip 236 adapted to puncture the seal of a cylinder such as cylinder 220 (FIGS. 6A-6B). The needle 234 may include any material, such as a metal or a polymeric material, suitably rigid to retain dimensional stability and puncture the seal of the cylinder 220 when the cylinder 220 contacts the tip 236. Upon puncturing the seal, gas or fluid leaving the cylinder 220 travels through at least a portion of the needle 234 and through the gas or fluid conduit 238.

Figures 8A, 8B, 8C, 8D:
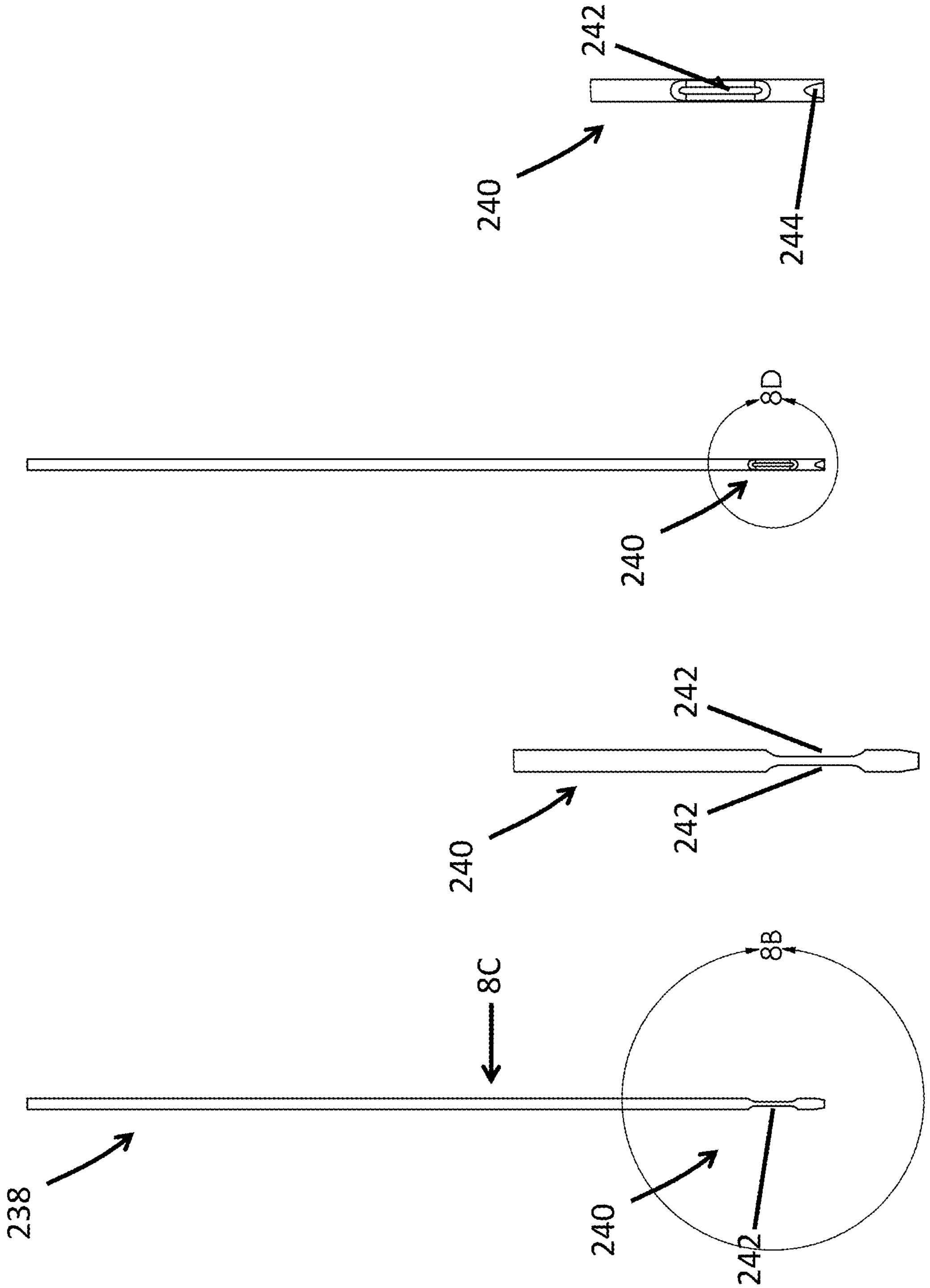
FIGS. 8A-8D illustrate an example gas or fluid conduit according to some aspects of the present disclosure.

FIGS. 8A-8D illustrate the example gas or fluid conduit 238 of FIGS. 7A-7B. FIG. 8A is a side view of the conduit 238; FIG. 8C is an additional side view of the conduit 238 taken at an angle perpendicular to the view of FIG. 8A, as indicated by arrow 8C in FIG. 8A. FIG. 8B is a partial enlarged view of distal section 240 indicated by arrow 8B in FIG. 8A. FIG. 8D is a partial enlarged view of distal section 240 indicated by arrow 8D in FIG. 8C.

The conduit 238 is a hollow tubular structure including a distal section 240 configured to receive gas and/or fluid from a cylinder 220 (FIGS. 6A-6B). The distal section 240 includes at least one opening through which the gas and/or fluid can enter the conduit 238. In the example conduit 238 of FIGS. 8A-8D, the distal section 240 includes side slots 242 disposed on opposing sides of the conduit 238. An end slot 244 is disposed at the end of the distal section 240. Thus, when the tip 236 of needle 234 (FIGS. 7A-7B) punctures the seal of a cylinder, the pressured gas and/or fluid leaving the cylinder can enter the conduit 238 through the side slots 242 and the end slot 244.

The size, shape, and configuration of side slots 242 and/or end slot 244 can advantageously control the pressure of gas and/or fluid entering the horn portion 230 (FIGS. 6A-6B) of a module. For example, in some embodiments the module may use a cylinder containing gas or fluid at a pressure substantially higher than a pressure desired for operation of a horn portion of a module. In some embodiments, the configuration illustrated in FIGS. 8A-8D may be suitable to reduce the pressure of gas or fluid entering the horn portion. For example, the configuration of side slots 242 and end slot 244 of the conduit 238 may be suitable for reducing a high pressure gas or fluid (e.g., up to 100 psi, 200 psi, 300 psi, 400 psi, 500 psi, 600 psi, 700 psi, 800 psi, 900 psi, 1000 psi, or more within the cylinder) to a lower pressure upon leaving the conduit 238 at a proximal end opposite the distal section 240 (e.g., as low as 100 psi, 90 psi, 80 psi, 70 psi, 60 psi, 50 psi, 40 psi, 30 psi, 20 psi, or lower).

Figure 9B:
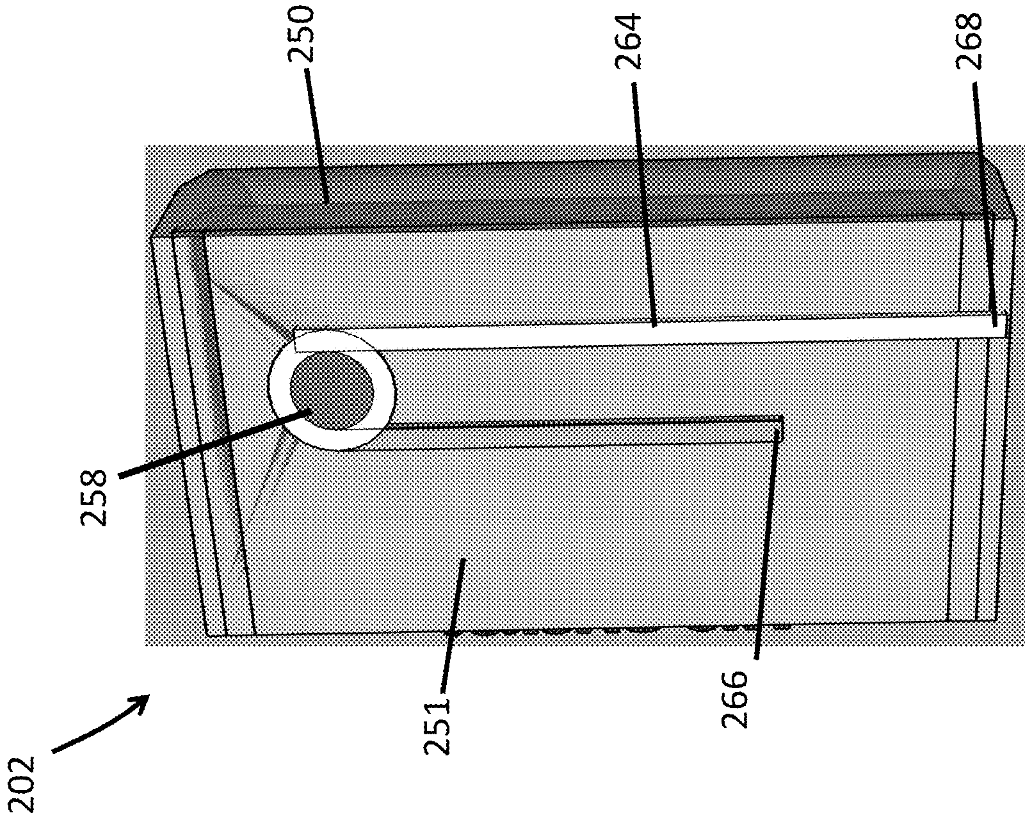
FIGS. 9A-9D illustrate an example system module according to some aspects of the present disclosure.
Figure 9A:
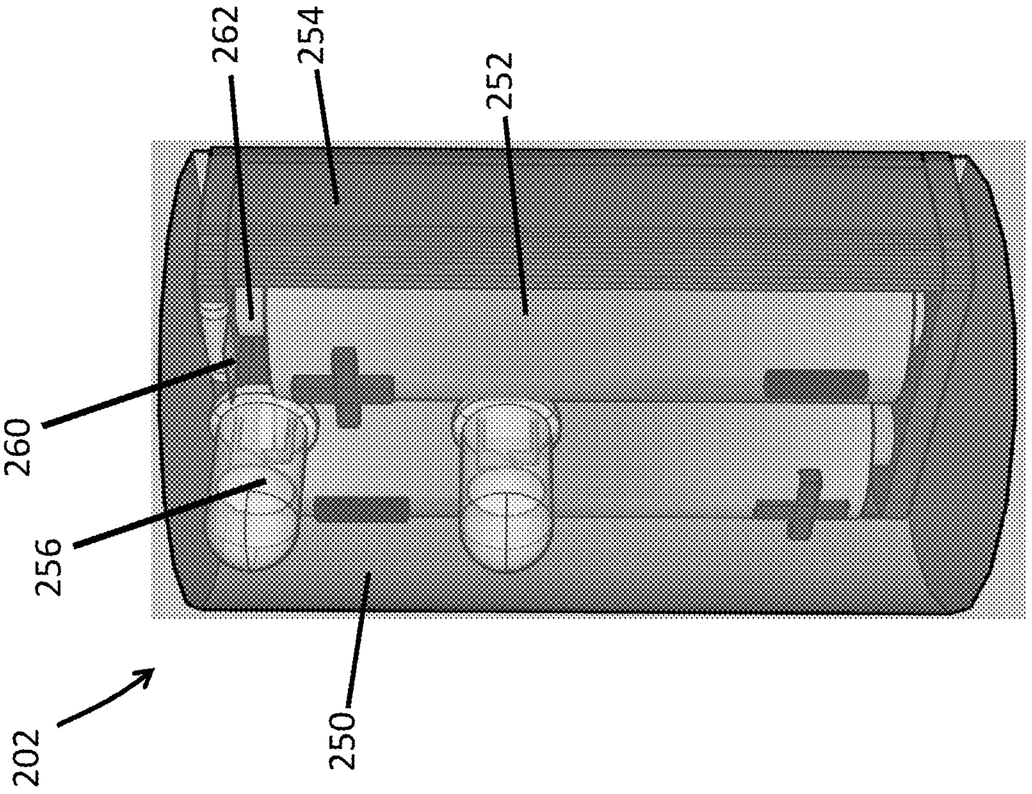
Figure 9C:
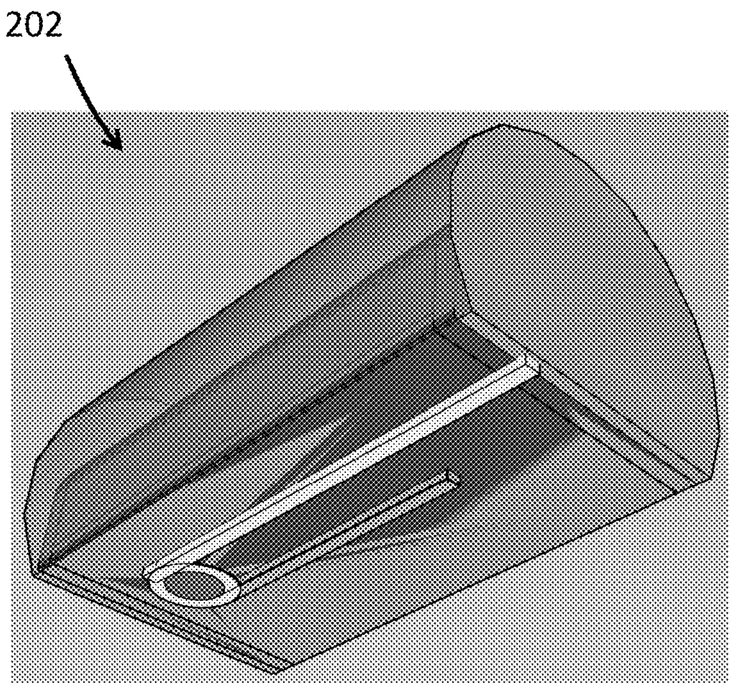
Figure 9D:
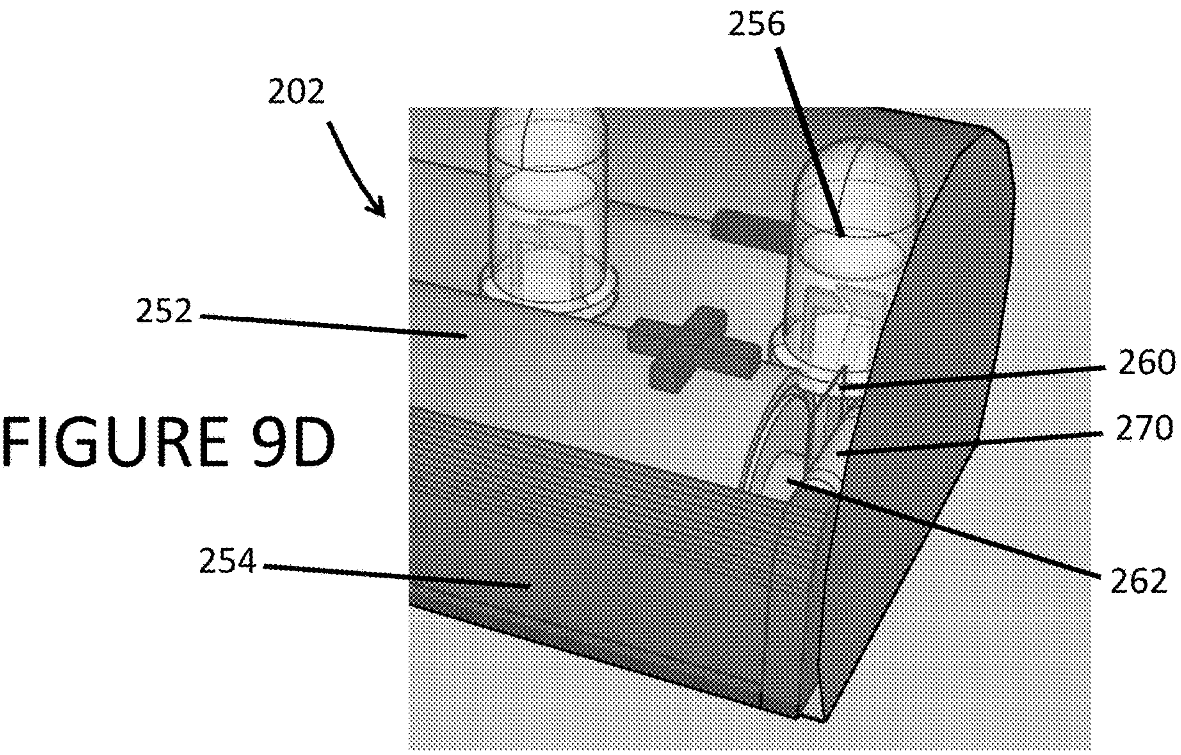

FIGS. 9A-9D illustrate an example alarm module 202 according to some aspects of the present disclosure. In various embodiments, an alarm module 202 as illustrated in FIG. 1 may be powered by compressed gas or fluid, and/or by electricity. The example alarm module 202 of FIGS. 9A-9D is configured to emit an auditory alarm and/or a visible alarm using electrical power. FIG. 9A is a front perspective view of the alarm module 202. FIGS. 9B and 9C are rear perspective views of the alarm module 202. FIG. 9D is a partial enlarged side perspective view of the alarm module 202 illustrating a triggering mechanism of the alarm module 202.

The alarm module 202 includes a housing 250 containing a source of electrical power such as one or more batteries 252. The housing 250 can further include one or more light sources 256, such as light-emitting diodes (LED), strobes (e.g., LED strobes), or other light sources configured to emit light, disposed on or at least partially within the housing 250. A sound emitter 258, such as a speaker, electromagnetic horn, or the like, can also be disposed on or at least partially within the housing 250, such as on a rear surface 251 of the housing 250.

The batteries 252 can be disposed within a battery holder 254 having circuitry therein for connecting the terminals of the batteries 252 to power the one or more light sources 256 and/or the sound emitter 258. In an armed configuration, as shown in FIGS. 9A-9D, an insulator 260 is disposed between at least one terminal 262 of batteries 252 and a corresponding contact of the battery holder 254 such that electricity does not flow through the battery circuit to power the one or more light sources 256 and/or the sound emitter 258.

To trigger the alarm module 202 at a high temperature associated with a fire being in the vicinity of the alarm module 202, a SMA wire 262 is disposed on or within the housing 250, such as along the rear surface 251 of the housing 250. The SMA wire 264 has a first end 266 anchored to the housing 250 and a second end 268 connected to the insulator 260 by a flexible connector 270, such as a flexible metallic or polymeric ribbon, or the like. When the SMA wire 264 reaches a temperature high enough to cause deformation, the SMA wire contracts or shortens, pulling on the flexible connector 270. The flexible connector 270 in turn pulls the insulator 260 outward such that the insulator 260 is removed from its location between the terminal 262 and the corresponding contact, completing the battery circuit.

Upon removal of the insulator 260 from the battery holder 254, electricity from the batteries 252 activates the one or more light sources 256 and/or the sound emitter 258. In some embodiments, the one or more light sources 256 are configured, when activated by electricity, to act as a strobe light by emitting light in a repeating pattern of flashes consistent with a fire alarm strobe. In some embodiments, the sound emitter 258 is configured, when activated by electricity, to emit an alarm sound such as a horn (e.g., an electromagnetic horn), a buzzer, one or more musical notes, or any other alarm sound at any suitable volume as described elsewhere herein. In some embodiments, the sound emitter 258 is configured to play a verbal warning message (e.g., "FIRE!", etc.). In some embodiments, the sound emitted by the sound emitter 258 is selected to interact with a voice-activated device such as a network-connected device (e.g., a digital assistant, a smart speaker, etc.). For example, the sound emitter 258 may play a message such as "Okay Google, call 911" or any other message suitable for activating a voice-activated device and causing the device to contact emergency services. In some embodiments, the sound emitter 258 may be configured to sequentially play a number of different messages selected to activate different types of voice-activated devices so as to increase the probability that a voice-activated device nearby will be activated upon triggering of the alarm module 202.

While certain arrangements of the present disclosure have been described above, it should be understood that they have been presented by way of example only, and not of limitation. It will be apparent to persons skilled in the relevant art that various changes in form and detail can be made therein without departing from the spirit and scope of the inventions. Thus the present inventions should not be limited by the above-described exemplary embodiments, but should be defined only in accordance with the following claims and their equivalents. Furthermore, while certain advantages of the inventions have been described herein, it is to be understood that not necessarily all such advantages may be achieved in accordance with any particular embodiment of the inventions. Thus, for example, those skilled in the art will recognize that the inventions may be embodied or carried out in a manner that achieves or optimizes one advantage or group of advantages as taught herein without necessarily achieving other advantages as may be taught or suggested herein.

What is claimed is:

1. A module for a heat-activated alarm system, the module comprising:
- a sound emitter;
- a power circuit configured to connect the sound emitter to a source of electrical power;
- an insulator disposed at least partially within the power circuit when the module is in an armed configuration such that the insulator interrupts the power circuit; and
- a shape memory alloy wire configured to connect the power circuit to provide electrical power to the sound emitter by at least partially removing the insulator from the power circuit upon a heating of the shape memory alloy wire to a deformation temperature,
- wherein a first end of the shape memory alloy wire is fixed relative to the module, wherein a second end of the shape memory alloy wire opposite the first end is mechanically connected to the insulator, and wherein the heating of the shape memory alloy wire to the deformation temperature causes a length of the shape memory alloy wire to decrease such that the insulator is pulled away from the power circuit.

2. The module of claim 1, wherein the power circuit comprises at least one battery and a conductive contact positioned to connect to a first terminal of the at least one battery, the insulator disposed between the conductive contact and the first terminal when the module is in the armed configuration.

3. The module of claim 1, wherein the sound emitter comprises an electromagnetic horn.

4. The module of claim 1, wherein the sound emitter comprises a speaker configured to play at least one of an alarm sound and a verbal message.

5. The module of claim 4, wherein the speaker is configured to play at least a verbal message selected to activate one or more voice-activated network-connected devices.

6. The module of claim 1, further comprising at least one light source configured to be powered by the power circuit when the insulator is at least partially removed from the power circuit.

7. The module of claim 6, wherein the at least one light source comprises at least one strobe.

* * * * *